INVENTOR.
ADOLPH RONNING
BY
Carlsen + Hazle
ATTORNEYS

July 8, 1958 A. RONNING 2,842,377
VEHICLE SUSPENSION HAVING DIFFERENTIALLY CONNECTED WHEELS
Filed Jan. 19, 1955 6 Sheets-Sheet 6
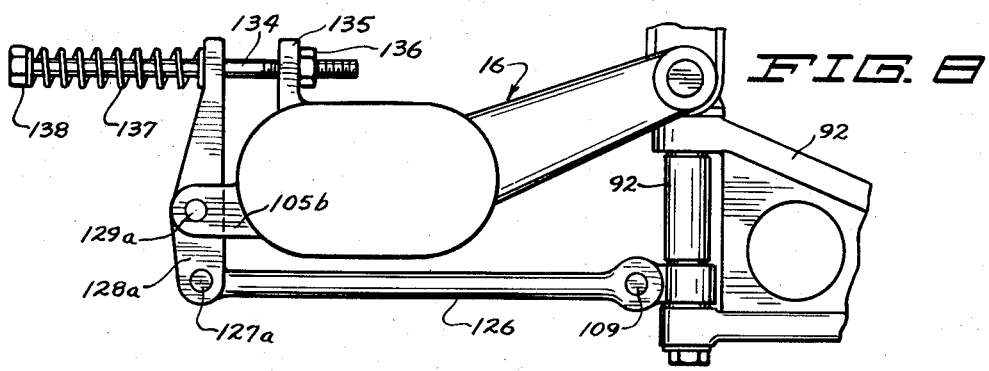
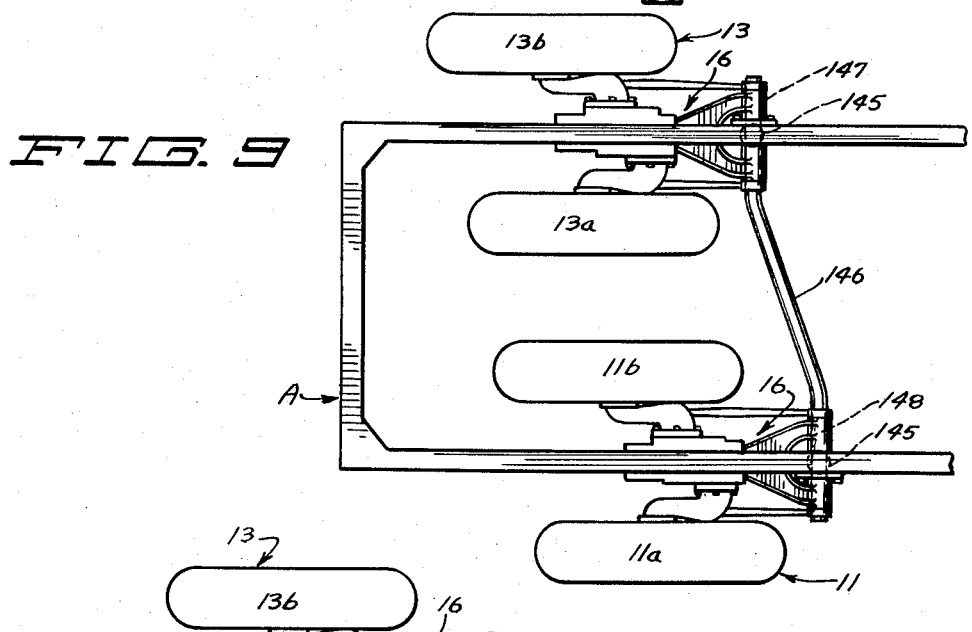
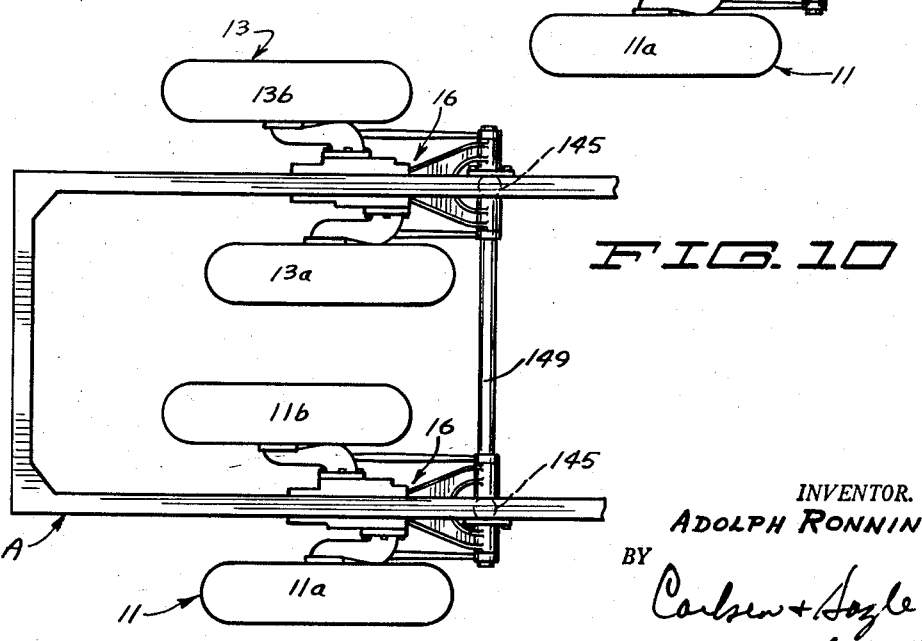
INVENTOR.
ADOLPH RONNING
BY
Carlsen + Hoyle
ATTORNEYS

United States Patent Office 2,842,377
Patented July 8, 1958

2,842,377

VEHICLE SUSPENSION HAVING DIFFERENTIALLY CONNECTED WHEELS

Adolph Ronning, Minneapolis, Minn.

Application January 19, 1955, Serial No. 482,831

20 Claims. (Cl. 280—104.5)

This invention relates to multi-wheel suspensions for vehicles, particularly heavy duty types such as over the road trailers or the like and provides a suspension in which the load is equally distributed to the several wheels with the wheels differentially mounted for relative upward and downward movements as they meet with uneven road surfaces.

The primary object is to provide improvements and refinements of the wheel suspension mechanism disclosed and claimed in my Patent No. 2,612,387, issued September 30, 1952, in order to reduce the weight of the parts involved, reduce the cost of the fabrication and assembly of the mechanism and generally improve the construction and operation. As disclosed herein and in the original patent identified the wheel suspension is of the tandem variety preferably, although not necessarily, with at least two pairs of wheels at each side of the vehicle, the individual wheels of each pair being differentially connected for opposite upward and downward movements, and each pair of wheels connected to a housing member extending forwardly and pivotally connected to the vehicle for up and down movements, while the pairs of wheels at each side are also connected by a walking beam type of element embodying spring means for yieldably resisting upward movements of the wheels. The wheels are connected to the housing members by cranked axles journaled on transverse axes into the housing members and with said axes of the individual axles relatively longitudinally offset so that one wheel of each pair is in advance of the other. In the patent the housing members extend for their full lengths at a downward and rearward angle from their pivoted forward ends and the journal axes of the axles of each pair are accordingly offset vertically one higher than the other. This is undesirable since it has a tendency to create uneven differential compensation between the individual wheels and it is a further object of the present invention to form the housing members with generally horizontal rear portions in which the forward ends of the axles are journaled in a common horizontal plane, the forward ends of the housing members then angling upwardly and forwardly to the points at which they are pivoted to the vehicle. In addition the housing members themselves are improved herein as is also the journals by which the axles are connected thereto.

A further object of the present invention is to improve, simplify and reduce the cost of the walking beam and spring elements by which the wheel assemblies are connected at each side of the vehicle and by which the load is sprung on the wheels, as will appear hereinafter.

The present invention also is a continuation-in-part of my copending application Serial No. 262,712, filed December 21, 1951, for Vehicle Suspension with Adjustable and Casterable Tandem Wheels, now Patent No. 2,764,421, issued September 25, 1956, in that the said housing members in addition to being pivotally mounted for upward and downward movements as aforesaid are pivoted to the vehicle about generally upright axes so that limited castering movements of the wheel assemblies is possible. Such castering action is controllable and permits the wheels a self-steering action as the vehicle travels a curved path to thus reduce the side skidding and scuffing of the tires heretofore so common in analogous wheel suspensions. The invention disclosed herein has as one of its objects the improvement and simplification of the self-steering or castering mounting of the wheels, over that disclosed in my prior application included among which improvements is the use of spring steel cross shafts to connect corresponding wheel assemblies at opposite sides of the vehicle with said shafts chosen as to size and material so that they themselves will yieldably restrict the castering actions of the wheels to proper prescribed amplitudes. As a related object my invention herein also contemplates the use of cross shafts which are bent adjacent their ends providing offset pivot portions to so offset the corresponding wheel assemblies that the front and rear wheels will be in line diagonally from one side of the vehicle to the other as shown in my prior application Serial No. 262,712.

It may be noted that I do not limit myself here to the tandem type of wheel suspension, many of the features set forth herein being applicable to a suspension made up of only one wheel assembly at each side of the vehicle, as will become apparent in the course of the disclosure to follow.

The present application is also a continuation-in-part from my copending application Serial No. 294,605, filed June 20, 1952, for Brake Torque Reactors, in that in the new structure disclosed herein I embody in an improved form the principle of transferring the brake torque reaction, set up as the brakes are applied to the wheels, from the axles to the vehicle at the points at which the housing members themselves are pivoted to the vehicle. This too will appear hereinafter.

Another object of the present invention, related to the overall object of improving and reducing the weight of the wheel suspension as a whole, is to provide an improved wheel structure per se having a number of advantages including lightness, strength and better cooling of the brakes.

These and other more detailed and specific objects will be disclosed in the course of the following specification, reference being had to the accompanying drawings, in which—

Fig. 2A is an enlarged detail sectional view of one of the swivel shackles used in the suspension.

Figs. 7 and 8 are fragmentary side elevations, on a reduced scale, showing additional modifications in the spring arrangement.

Figs. 9 and 10 are plan views, on a reduced scale, showing two modifications in a spring resisted caster mounting for the wheel suspension.

Fig. 11 is another detail fragmentary elevation, on a reduced scale, of another modification for spring supporting the load on the wheels.

Figure 1:
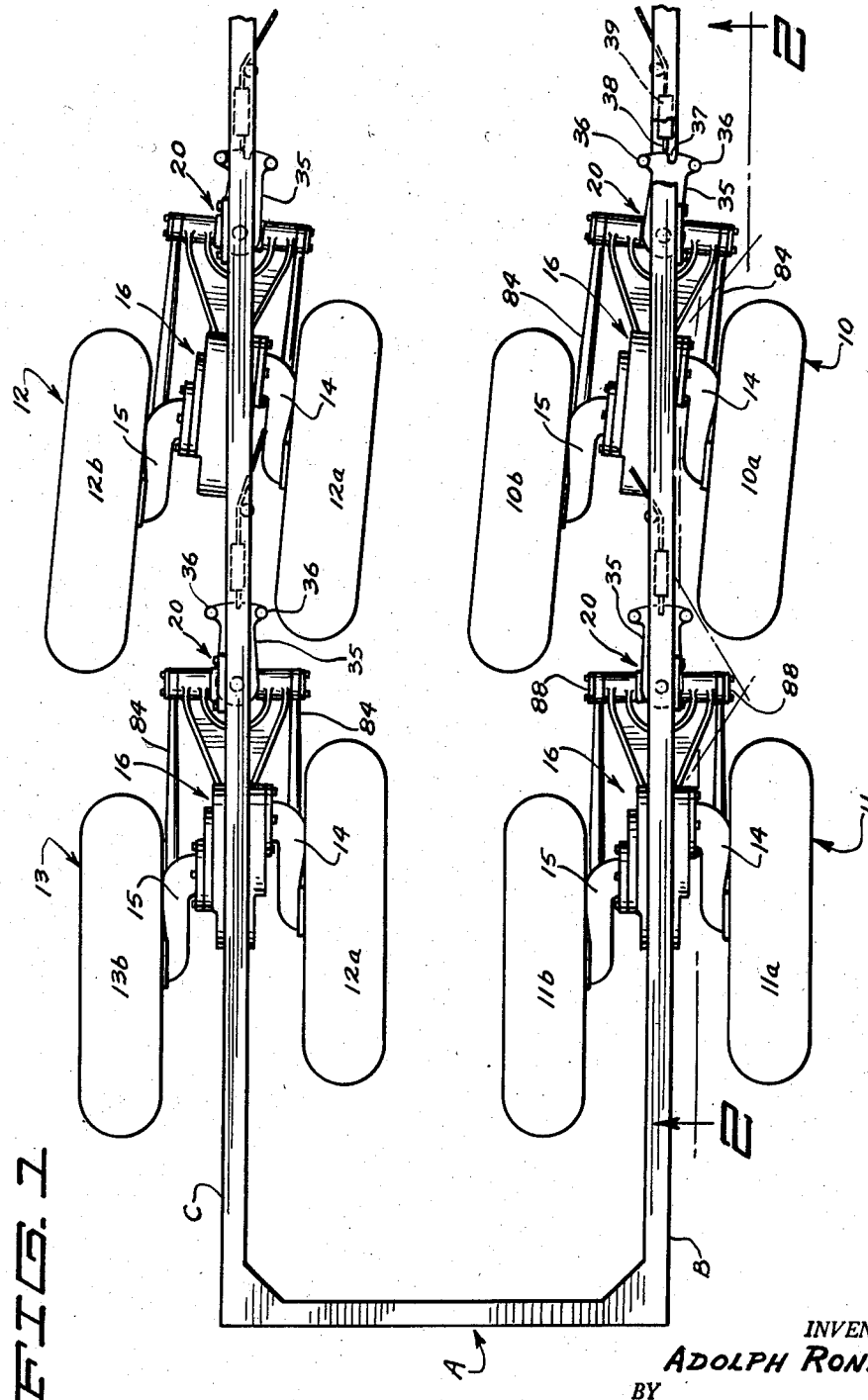
Fig. 1 is a top plan view of a tandem wheel suspension according to my invention, a part of a vehicle frame being shown and the forward wheels being castered to one extreme of their castering movement.

Referring now more particularly and by reference characters to the drawing, my invention as shown in Figs. 1 through 5 will first be described and as in my prior Patent No. 2,612,387 the same comprises four wheel pairs or wheel assemblies arranged two in tandem at each side of the vehicle frame which is designated generally at A. The respective wheel pairs or assemblies are indicated generally at 10, 11, 12 and 13 and each comprise a pair of pneumatic tired wheels which as viewed from above are on opposite sides of the longitudinal sills B and C of the vehicle frame. Since each of the wheel pairs or assemblies are identical except for very minor details only one will be described in detail and the corresponding elements of the other will be designated by related reference characters.

The wheel pair or assembly 10 includes transversely spaced wheels 10a—10b which are journaled as will presently appear on the rear ends of forwardly extending cranked axles 14—15 the forward ends of which are journaled on transverse axes into a housing member 16 which extends generally forwardly and upwardly and has a forked forward end 17 terminating in transversely spaced and coaxially related bearings 18—19. This assembly of the pair of wheels, two cranked axles and the housing member is supportably and pivotally connected to the underside of the adjacent frame sill B by a two-part mounting bracket or means indicated generally at 20 and shown to best advantage in Fig. 5 and which is in most respects identical to that disclosed and claimed in my aforementioned copending application Serial No. 262,712. This mounting means 20 comprises an upper bracket 21 which is skeletonized for lightness and secured as shown to the frame sill and which has a base 21a from which there depends an annular, inner bearing collar 22. Said means 20 also includes a lower part 23 having a central upwardly extending annular outer bearing collar 24 rotatably mounted about said collar 22 with an intervening anti-friction bearing 25. Thus the lower part 23 of the bracket or mounting means is arranged for movement relative to the upper and to the vehicle frame A about a generally upright axis and the parts are held against relative axial engagement by a bolt 26 the head 27 of which fits in a recess for its reception in the base 21 and the nut 29 of which is turned up below the underside of the lower part 23 of the assembly. It may here be noted that the bearing 25 (as are the many other bearings found throughout the assembly except as hereafter noted) is of the oilless type, the metal being impregnated with a lubricant and commonly called "oilite." Wherever such bearings are used in the assembly the parts move at slow speed relative to each other and no other lubrication is necessary other than that in the bearings themselves.

In addition the lower part 23 of the bracket or mounting means 20 has transversely spaced depending bearings 30—31 which fit respectively inside of the bearings 18—19 of the housing member 16 and a pivot pin 32 is extended through these bearings so that the housing member and its associated wheels may swing upwardly and downwardly relative to the frame A about a generally transverse axis. It will be noted in Fig. 3 that here also the parts are fitted with the types of bearings referred to before, designated throughout at 33.

Figure 5:
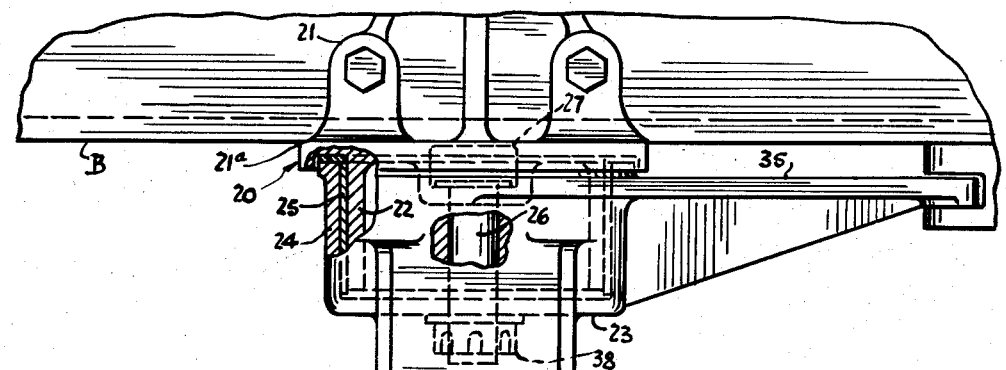
Fig. 5 is a still further enlarged fragmentary side elevation, partially in section, of the forepart of the suspension.

The load is not borne by the bolt 26 which serves only to hold the parts in assembly, there being a thrust bearing 34 provided between the upper and lower parts of the assembly 20 as seen in Fig. 5.

It will be observed from the foregoing that not only may the wheel pair or assembly move upwardly and downwardly as it travels over irregular road surfaces but that it may caster or self-steer about an upright pivot axis and as in my earlier application Serial No. 262,712 I utilize but control this self-steering tendency to reduce scuffing of the tires as the vehicle travels an arcuate path. For so controlling this castering action the lower part 23 of the mounting means 20 is provided with a forwardly extending stop arm 35 located below the frame sill B and provided with transversely spaced and upwardly projecting stops 36 to engage the inner and outer edges of said sill and thus restrict the amplitude of the castering motion. Centrally this stop arm 35 is notched at 37 (Fig. 1) and a retractable latch pin 38 longitudinally slidable in a bracket 39 fitted to the underside of the sill B may be engaged with said notch to prohibit the castering action entirely, if so desired.

Figure 2:
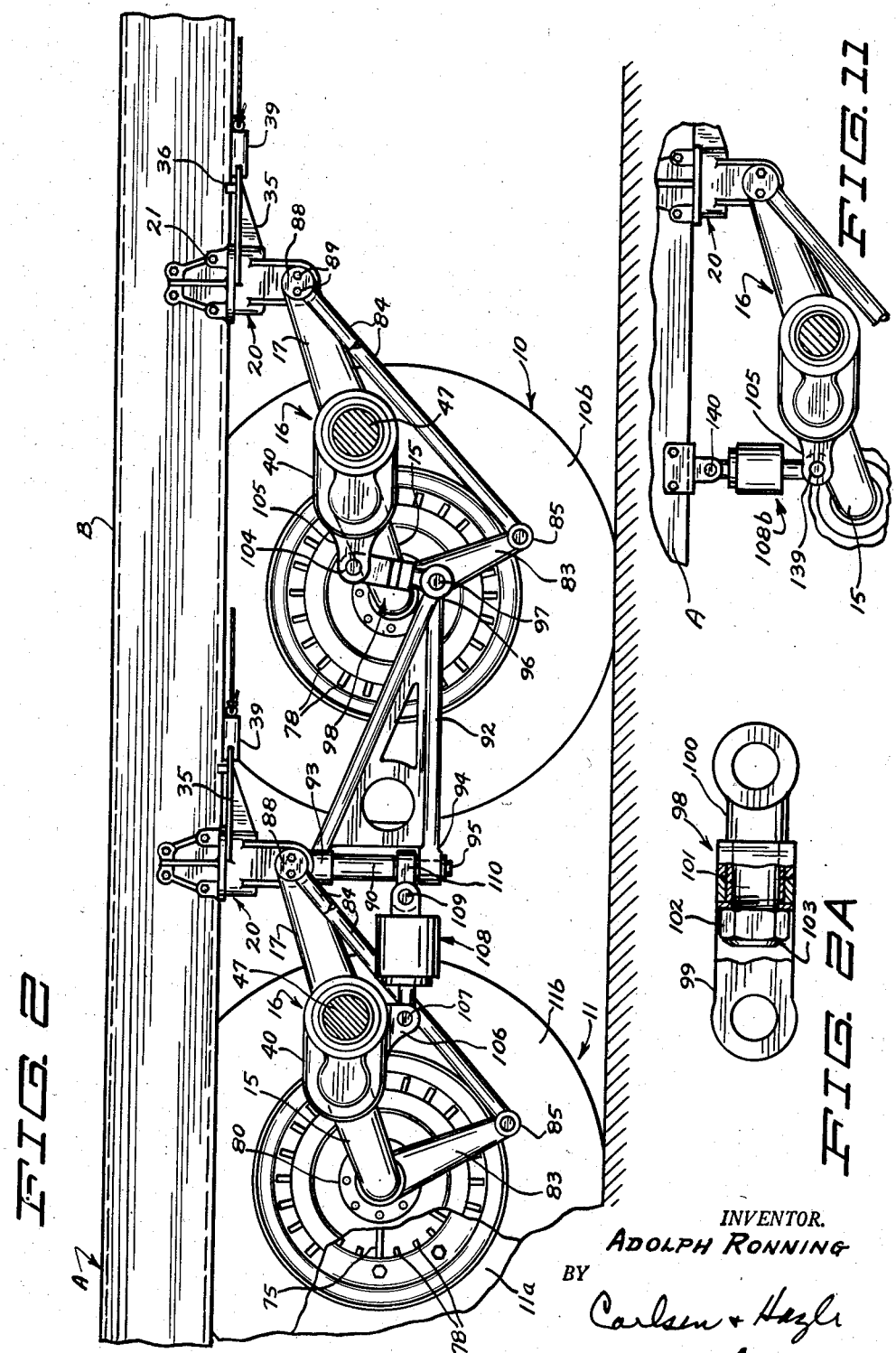
Fig. 2 is an enlarged side elevation partially in section, taken substantially along the line 2—2 in Fig. 1, with the near wheels removed except for a fragment at the rear.
Figure 3:
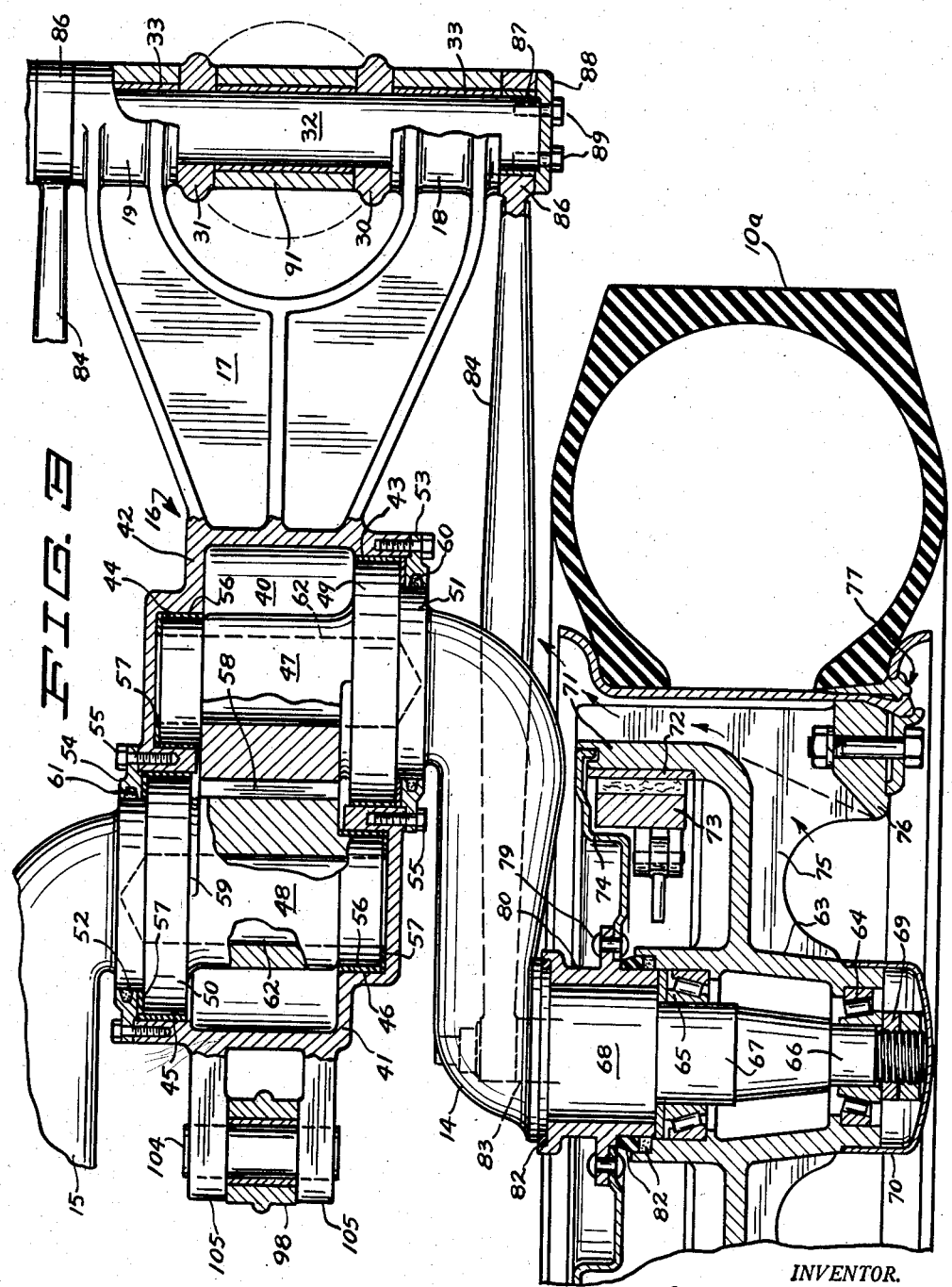
Fig. 3 is an enlarged fragmentary horizontal sectional view through one of the front wheel assemblies.

The housing member 16, as best seen in Fig. 3, has a hollow rear portion 40 with opposed parallel sides 41—42 and it is into this part of the member that the cranked axles 14—15 are journaled. A large bearing opening 43 is formed through the outer side 41 of the housing member and oppositely thereto and coaxially therewith the opposite inner side 42 has a blind bearing recess 44 opening inwardly only. Likewise the inner side 42 of the housing member has a large bearing opening 45, located rearwardly as well as oppositely with respect to the opening 43, and coaxial with this rear bearing opening 45 is a smaller blind bearing recess 46 opening only inwardly. The sides 41—42 are outwardly bossed where these bearings are formed, as clearly seen in Figs. 2 and 3. The axles 14—15 are respectively provided at forward ends with oppositely, transversely turned trunnions 47—48 which fit into the hollow rear part 40 of housing member 16 and the extremities of said trunnions are reduced slightly to fit into the blind bearing recesses 44—46. Where they pass through the bearing openings 43—45 the trunnions 47—48 have enlarged journals 49—50 and immediately outward of said journals the trunnions are reduced forming annular shoulders 51—52. Annular retainer rings 53—54, having internal diameters to fit said shoulders 51—52, are secured by cap screws 55 to the housing member and serve to hold the trunnions against axial displacement, it being here noted that these retainer rings are also of such diameter that they may be slipped over the axles 14—15 from the rear ends thereof in assembling the parts. In each instance the trunnions 47—48 are journaled in anti-friction bearings denoted throughout at 56 and thrust bearings 57 oppositely engage the ends of the trunnions and the outer faces of the journals 49—50 to take the end thrust. The hollow interior of the housing member is filled with a suitable lubricant which serves to continuously lubricate meshing gear teeth 58 formed directly in the trunnions 47—48, which are suitably relieved at 59 to permit machining the teeth. Obviously the meshing of these gear teeth will cause a differential upward and downward movement of the axles 14—15 as set forth in more detail in my Patent No. 2,612,387. The retainer rings 53—54 are internally grooved to receive dust seals shown in Fig. 3 at 60—61 which bear on the shoulders 51—52. In accordance with my objectives of reducing costs and weight it is to be noted that the bearing openings and recesses in the housing member may be readily machined from opposite sides thereof, and that the trunnions are so designed that their machining may also be readily accomplished. The design of the housing member is further such that its weight is kept at a minimum consistent with the required strength, and to reduce the weight of the axles themselves the trunnion ends thereof are bored out from their ends as designated at 62 in Fig. 3.

In furtherance of reducing the overall weight of the assembly I provide a novel wheel which may be cast of aluminum, or analogous light metal, and which has other advantages as will now be described. Only one wheel is shown in Fig. 3 but the construction of each wheel is, of course, the same throughout. Said wheel has a hub 63 in which are spaced apart roller bearings 64—65 fitted to correspondingly spaced journal portions 66—67 of the outwardly turned pintle end 68 of the axle. From the axle itself outwardly the end 68 is progressively reduced in diameter, bearing 64 being the smallest, so that the wheel may be pulled from the axle, and the outer extremity of said pintle end is threaded to receive the retainer nut 69, which is covered by a removable dust cap 70 as usual. Formed integrally with the hub 63 is a brake drum 71 having its annular inner surface lined by a cast iron (or other suitable metal) band 72 secured to the drum by any suitable bonding or welding method. Said drum and band, of course, constitute the rotating part of a brake assembly, one brake shoe of which fragmentarily appears at 73 which is carried by a backing plate 74 in the usual manner. Also cast integrally with the hub 63 are a plurality of radially extending fins 75 which are joined by a circular ring 76 by which the usual tire mounting and rim structure, designated generally at 77, is secured to the wheel. It is to be noted that these fins 75 also project beyond the rim of the brake drum, and that in addition to these fins which carry the load there are a number of intervening fins 78 between them. All of the fins cooperate to serve as a blower or fan as the wheel rotates, to move air in the general path designated by the arrows in Fig. 3 causing the air to pass in heat exchanging relation to the brake drum in order to cool the brakes. Thus I have provided a light weight wheel which has provision for cooling its brakes both of which are very desirable features.

As stated hereinbefore the brake torque reaction which would normally be effective about the axis of the wheel is transmitted instead to the frame of the vehicle, bypassing the differential mechanism connecting the wheels, and for this purpose the backing plate 74 is riveted at 79 to a bearing collar 80 rotatably mounted on a bearing surface formed by the pintle end 68 (Fig. 3) of the axle. Suitable sealing rings denoted throughout at 82 are strategically located to exclude dust and retain lubricant in the hub of the wheel. A lever arm 83 is formed on or secured to the collar 80 carrying the brake backing plate 74 and as shown to best advantage in Fig. 2 this lever arm angles downwardly and forwardly. A brake torque reactor link 84 is pivoted at 85 to the lower end of the lever arm and from that point angles upwardly and forwardly to a point alongside the end of the aforesaid pivot pin 32 whereat the link is formed with an eye 86 pivoted by an anti-friction bearing 87 upon the end portion of the pivot pin and held in place by a cap plate 88 secured by cap screws 89 to the end of the pin (Fig. 3). Thus it will be seen that the brake torque reaction, tending to rotate the backing plate 74, will be transmitted through the lever arm 83 and link 84 to the pivot pin 32 and thence directly to the frame. The length of lever arm 83 is, of course, such that the parts will clear in all positions of the wheels.

Reverting to the construction of the wheel as heretofore described it is to be understood that the band 72 is bonded to, and is in molecular contact with, the wall 71 of the brake drum so that the flash heat generated when the brake shoes 73 is applied to the band will be dissipated rapidly through the wall by the air flowing thereacross, between the fins 75—78 and within the tire rim assembly 77.

Figure 4:
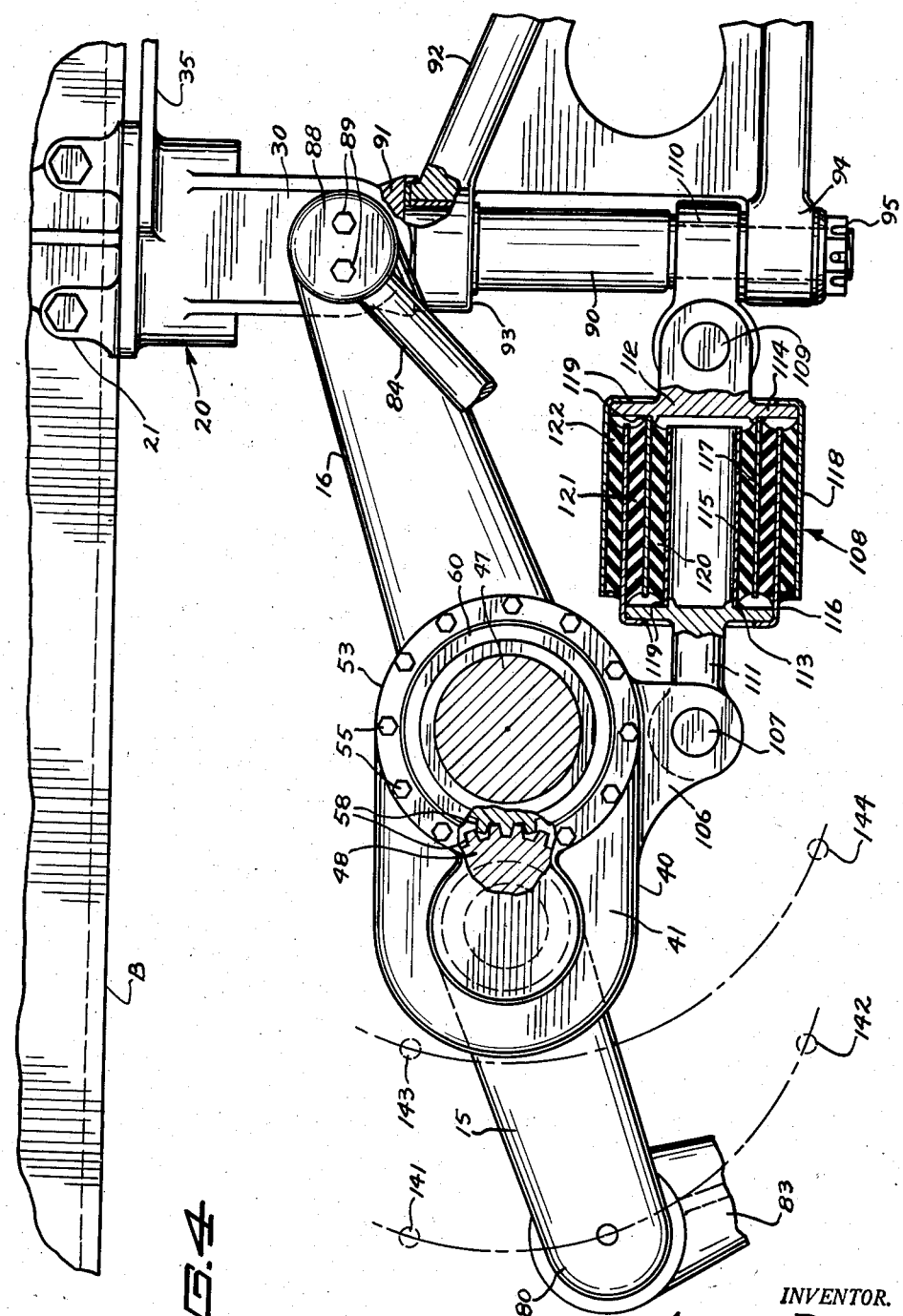
Fig. 4 is a further enlarged fragmentary longitudinal and vertical sectional view of the rear portion of the suspension.

Four of the wheel pairs or assemblies as just described go to make up the tandem wheel suspension of Figs. 1–5 and as stated two of such assemblies 10—13 are arranged at each side of the vehicle, the forward ends of the housing members 16 each attached by a mounting bracket 20 to the adjacent frame sill B or C as the case may be. The individual wheels of the assemblies 11, 12 and 13 are respectively designated at 11a—11b, 12a—12b and 13a—13b but the housing members, axles and mounting brackets are designated throughout by the same reference characters as employed in the detailed description of the one assembly 10, since these parts are essentially identical. The front and rear wheel assemblies 10—11 and 12—13 at each side of the vehicle are so connected that they have a sort of walking beam differentiating effect, in addition to the individual differential action of the wheels themselves, and since the wheel assemblies may all or in part be permitted a self-steering or castering action these connections, front to rear, necessarily provide for some lateral flexibility. At each side of the vehicle, from each rear mounting bracket 20, there depends a heavy, upright connector bolt 90 which as best seen in Figs. 3 and 4 is pivotally suspended for forward and rearward swinging movements by means of a bearing 91 at its upper end engaging the center of the aforesaid pivot pin 32. A beam 92 extends forwardly and rearwardly at each side of the vehicle and at its rear end has upper and lower bearings 93—94 which are pivotally mounted on the connector bolt 90, the beam being held against downward displacement by a nut 95 threaded on the lower end of the bolt. The beam tapers toward its forward end, terminating in an eye 96 to which is pivoted at 97 the lower end of a swivel shackle 98. The said shackle has upper and lower parts 99—100 swiveled together by a pin 101 and nut 102, the latter being welded at 103 to the pin once the shackle is assembled. The upper end of the shackle is pivoted by a pin 104 between a transversely spaced pair of lugs 105 extending rearwardly from the forward housing member 16. It will be noted that this front to rear connection for each tandem pair of wheel assemblies, as so far described, has freedom for lateral swinging movements about the axes of the connector bolt 90 and swivel shackle 98 as well as for up and down movements about the transverse axes of the rear pivot pins 32, and the connecting pins 97 and 104 at the front of the beam 92.

Each rear housing member 16 is provided on its underside with spaced apart apertured lugs, one of which appears at 106, and a cross pin 107 connects the rear end of a load carrying spring element, designated generally at 108, while the forward end of the spring element is connected by a similar cross pin 109 to the rear apertured end of a bearing fitting 110 which is journaled on the connector bolt 90 immediately above the lower bearing 94 of the beam 92. It is to be noted that it is in the arrangement of the respective lugs 105 and 106 that the only difference lies between the housing members 16 for the front and rear assemblies.

Preferably the spring element 108 is constructed as best shown in Fig. 4, being made up of relatively forwardly and rearwardly movable parts 111—112 connected respectively to the pins 107—109 and having facing flanges 113—114 to each of which there are affixed inner and outer cylindrical sleeves 115—116 and 117—118 arranged in loosely telescoping relation, as clearly shown. The sleeves 115 through 118 are welded or otherwise rigidly secured to the respective flanges 113—114, as designated throughout at 119. Cylindrical elastic inserts, of rubber or the like, indicated at 120, 121 and 122 and properly sized as to diameter, are located in the three spaces between the four sleeves 115, 116, 117 and 118 and are bonded to these sleeves to yieldably resist relative endwise movements of the parts 111—112.

Referring to Fig. 2 it will be readily understood that any tendencies of the front and rear wheel assemblies 10 and 11 (and of course 12 and 13 at the opposite side of the vehicle) to move upward relative to the vehicle frame will be yieldably resisted by the spring element 108 thus springing the load on the wheels, and it will also be understood that limited upward and downward deflection of the wheel assemblies will be permitted due to the walking beam action of the beam 92 pivoting about the rear pivot pin 32. It will also be noted that the spring element 108 is under tension in resisting such upward deflections of the wheel assemblies, an upward movement of either front or rear assembly tending to increase the distance between the pins 107—109 by which the spring element is connected in the system. Due to the differential compensating effect of the individual wheels 10a—10b, etc., the amount of vertical deflection of the wheel assemblies per se is materially reduced and the bonded rubber inserts 120—122 will provide more than the necessary elasticity for properly springing the load.

Figure 6:
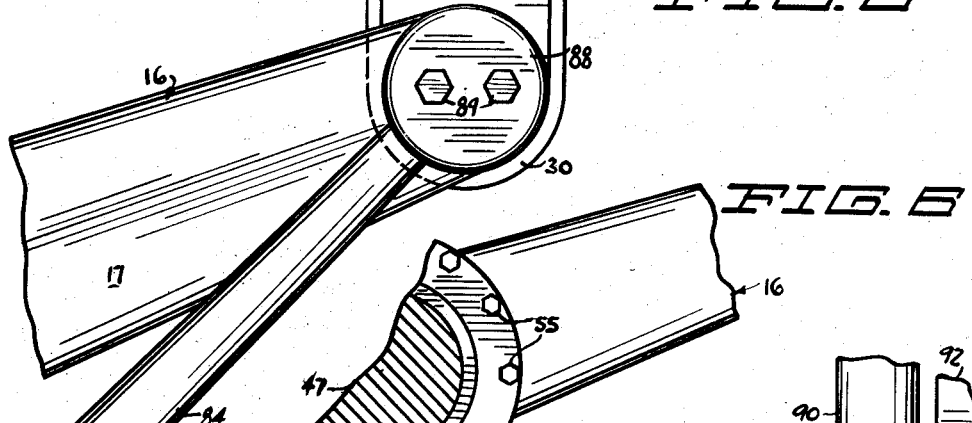
Fig. 6 is an enlarged fragmentary detail view showing a modification of the spring for carrying the load.

In Fig. 6 I show a modified spring element 108a and in this case the rear part 111a which is attached at 107 to the lug 106 is hollow and embraces the forward part 112a attached to pivot pin 109, providing in fact telescoping relation of the parts as seen at 123. Opposed cups 124—124a are respectively threaded upon and welded to the parts 111a—112a and a volute spring 125 is braced between these cups to oppose upward movements of the wheel assemblies, as will be readily understood.

The freedom for lateral swinging movements of the parts in these front to rear connections for the wheel assemblies or pairs 10—11 and 12—13 is, of course, for the purpose of enabling the assemblies to caster or self-steer about the upright axes of the bracket bearings 22—24, such movements being limited or prevented by the stop arms 35 and latches 38 as set forth in my application Serial No. 262,712 previously identified.

Also as stated hereinbefore wherever pivotal action is provided between the parts the oil-less type of bearings or bushings are employed, as for example at the connector bolt 90, shackles 98, etc., and it is further to be noted that, in accordance with one of the objectives of my present invention, i. e., the facilitating of manufacture and assemblies, one at each side of the vehicle and in such 90 has bearing portions which diminish in diameter downwardly so that the beam 92 and spring element 108 may be readily installed or pulled downward off the bolt for servicing.

Figure 7:
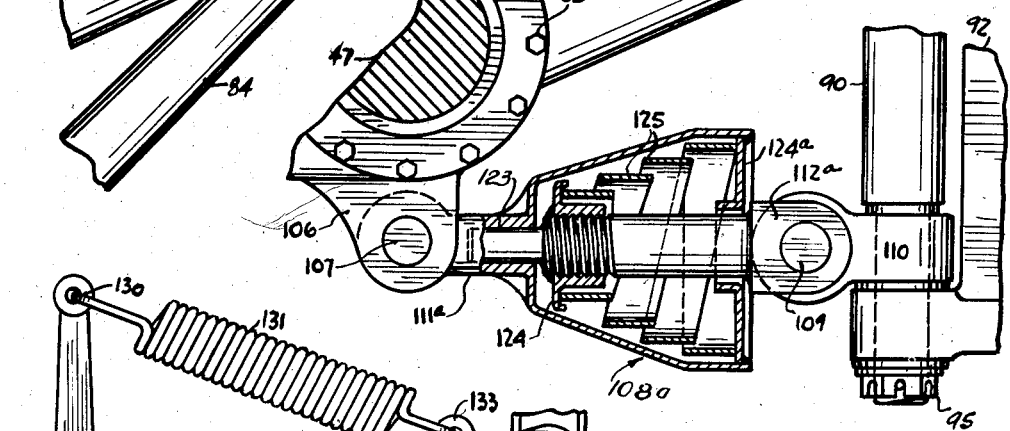

In Fig. 7 I show another modification of the spring suspension for the load, in which view one of the housing members again appears at 16 but is shown only in outline. By means of the same bearing fitting 110 and its pin 109 previously identified a link rod 126 is connected to the lower end portion of the connector bolt 90, said rod extending rearwardly beneath the underside of the housing member 16 and being pivoted at 127 to an upright lever 128. Said lever 128 is fulcrumed at 129 between spaced lugs, one of which is seen at 105a, extending rearwardly from the housing member, being exactly the same as the aforesaid lugs 105, and the lever extends upwardly beyond the housing member. The upper end of the lever 128 has connected thereto at 130 a retractile coil spring 131 which extends from that point forwardly and which is then connected at its forward end at 132 to an apertured lug 133 provided on the housing 16 at a suitable point. As will be clearly apparent this spring 131 will serve to yieldably resist upward deflections of the wheel assemblies 10, etc. A spring suspension of this kind may be advantageous, particularly if the fulcrum 129 for lever 128 is, as shown, so located as to provide a favorable leverage ratio according to the load and the characteristics of the spring itself.

A similar spring suspension is shown in Fig. 8 wherein the housing member 16 is again shown only in outline, and the same relationship of the link rod 126, connector bolt 90, etc., is present. In this case however lugs, one of which appears at 105b, are provided near the lower rear part of the housing member and a lever 128a is pivoted at its lower end at 127a to the rear end of link rod 126. Said lever is fulcrumed at 129a between the lugs 105b and extends upward beyond the rear portion of the housing member and is apertured at its upper end to slidably receive a long bolt 134 the forward end of which is slidable through a lug 135 on the upper rear part of the housing member. A nut 136 is threaded on the forward end of the bolt 135 and a heavy expansion coil spring 137 is placed on the bolt between its head 138 and the upper end of the lever 128a and thus will again yieldably resist upward deflection of the wheel assemblies. Not only does the nut 136 permit adjustment of the effective spring resistance to deflection, in this suspension, but it will here be noted that the fulcrum 129a for the lever 128a is so located as to affect the leverage on the spring, which may be desirable in some instances.

When the load involved does not require tandem wheel assemblies it is readily possible to use only a pair of wheel assemblies, one at each side of the vehicle and in such case the construction and operation of the various components are exactly as has been described but, as seen in Fig. 11, a spring element designated generally at 108b is connected at 139—140 directly between the rear portion of each housing member 16 and the adjacent frame A of the vehicle. The spring element 108b may be like that designated heretofore at 108 or 108a, or of other suitable construction, and may conveniently as shown in Fig. 11 be pivotally connected between the lugs 105 on the housing and a suitable bracket secured to a convenient part of the vehicle frame itself.

Throughout the foregoing arrangement will be noted the generally horizontal plane of the hollow rear portion 40 of the various housing members 16 and the location of the differentially connected trunnion ends 47—48 of the cranked axles 14—15 in a common horizontal plane, one ahead of the other. Contrasting this with the showing in my Patent No. 2,612,387 it will be apparent that the present arrangement is preferable in that the differential compensation as between the individual wheels of each wheel assembly 10, etc., is made smoother because the cranked axles 14—15 will now each assume the same angles relative to the road surface as they reach the extremes of their differential swinging travel. A comparison of the wheel centers 141—142 at the two extremes for the rear axle and the corresponding wheel centers 143—144 for the front axle, as they are seen in Fig. 4, will make this clear.

Also as shown in my prior Patent No. 2,612,387 I may cross connect the corresponding wheel assemblies at opposite sides of the vehicle frame as is diagrammatically shown in Figs. 9 and 10, wherein only two of such wheel assemblies are shown and are designated generally at 11 and 13. However, in accordance with my present invention I here also mount each wheel assembly by a bracket like that designated at 20 hereinbefore so that the wheel assemblies may caster or self-steer about upright axes, designated in both Figs. 9 and 10 at 145. For cross connecting these caster mounted wheel assemblies I then, in Fig. 9, employ a spring steel (or other material) cross shaft 146 so chosen, both as to the characteristics of the spring material from which it is made and as to its diameter and length, that it will permit yieldable deflection at its ends sufficient to permit the wheel assemblies to caster through the required range. In Fig. 9 this cross shaft 146 is reversely bent so that its ends 147–148 are offset one ahead of the other a distance sufficient to bring all of the wheels 11a–11b and 13a–13b into a common diagonal line or angle from the transverse and from one side of the vehicle to the other. This wheel pattern has advantages which have been made clear in my earlier disclosures. Of course, and as seen in Fig. 10, a straight cross shaft 149 may be used where it is desired to locate the wheel assemblies 11—13 in transverse alignment and in either case the spring cross shafts may be used in tandem wheel suspensions as well.

It is further understood that the cross shafts, either 146 or 149, replace the pivot pins 32 heretofore described and support the wheel assemblies for their necessary upward and downward movements relative to the vehicle frame A.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A wheel suspension for a vehicle frame, comprising a forwardly and rearwardly extending member having a generally horizontal rear portion and an upwardly and forwardly extending forward portion, means pivoting the forward end of the member to the vehicle frame on a generally transverse and horizontal axis and said forward portion angling downwardly and rearwardly from said pivot, cranked axles extending rearwardly from each side of the member and having their forward ends journaled on transverse axes in a common horizontal plane on the horizontal rear end portion of the member, ground wheels supporting the rear ends of the axles, and means differentially connecting the axles for opposite upward and downward movements about their forward journaled ends.

2. A wheel suspension for a vehicle frame, comprising a forwardly and rearwardly extending member having a generally horizontal rear portion and an upwardly and forwardly extending and angling forward portion, means pivoting the forward end of the member to the vehicle frame on a generally transverse and horizontal axis, cranked axles extending rearwardly from each side of the member and having their forward ends journaled on transverse axes in a common horizontal plane but in relatively forwardly and rearwardly offset relation into said horizontal rear end portions of the members, ground wheels supporting the rear ends of the axles, means differentially connecting the axles for opposite upward and downward movements about their forward journaled ends, and means resisting upward movements of the ground wheels relative to the frame.

3. In a vehicle wheel suspension assembly, a downwardly and rearwardly extending housing member and means pivoting the same at its forward and upper end to the vehicle for upward and downward movements, means yieldably resisting upward movement of said housing member, the housing member having a forward portion extending rearwardly and downwardly from said pivot means and a hollow rear portion extending substantially horizontally and rearwardly, cranked axles extending rearwardly from alongside said hollow rear portion of the housing member and having forward ends pivotally mounted in forwardly-rearwardly offset relation in said hollow rear portion but in a substantially common horizontal plane, wheels supporting the rear ends of the axles, and means within the hollow rear end of the housing member differentially connecting the axles.

4. In a vehicle wheel suspension assembly, a rearwardly and downwardly angled housing member and means pivoting the same at its upper forward end to the vehicle for upward and downward movements, means yieldably resisting upward movement of said housing member, the housing member having a rear portion extending substantially horizontally and rearwardly, cranked axles extending rearwardly from alongside said rear portion of the housing member and having forward ends pivotally mounted in forwardly-rearwardly offset relation in but not completely through said rear portion and in a substantially common horizontal plane, bearings of different diameter in said rear portion of the housing member journaling and supporting each axle, wheels supporting the rear ends of the axles, and means within the rear end of the housing member differentially connecting the axles.

5. In a vehicle wheel suspension assembly, a housing member and means pivoting the same at its forward end to the vehicle for upward and downward movements, means yieldably resisting upward movement of said housing member, the housing member having a forward portion extending rearwardly and downwardly from said pivot means and a rear portion extending substantially horizontally and rearwardly, cranked axles extending rearwardly from alongside said rear portion of the housing member and having oppositely turned transversely extending trunnions at their forward ends, the opposite sides of the rear portion of the housing member having forwardly and rearwardly offset bearing openings and opposite thereto blind bearings of smaller diameter, said trunnion ends having bearing portions journaled in said bearing openings and smaller end portions journaled in said blind bearings, annular retainer rings releasably secured to the housing and holding the trunnion ends thereinto, wheels supporting the rear ends of the axles, and means differentially connecting the axles for opposite upward and downward movements.

6. In a vehicle wheel suspension assembly, a housing member and means pivoting the same at its forward end to the vehicle for upward and downward movements, means yieldably resisting upward movement of said housing member, the housing member having a forward portion extending rearwardly and downwardly from said pivot means and a rear portion extending substantially horizontally and rearwardly, cranked axles extending rearwardly from alongside said rear portion of the housing member and having oppositely turned transversely extending trunnions at their forward ends, the opposite sides of the rear portion of the housing member having forwardly and rearwardly offset bearing openings and opposite thereto blind bearings of smaller diameter, said trunnion ends having bearing portions journaled in said bearing openings and smaller end portions journaled in said blind bearings, annular retainer rings releasably secured to the housing and holding the trunnion ends thereinto, seals in said retainer rings engaging the trunnion ends outwardly of the bearing openings, wheels supporting the rear ends of the axles, and the trunnion ends of the axles having meshing gear teeth to cause the axles to differentially move upwardly and downwardly.

7. In a vehicle wheel suspension assembly, a housing member and means pivoting the same at its forward end to the vehicle for upward and downward movements, means yieldably resisting upward movement of said housing member, the housing member having a forward portion extending rearwardly and downwardly from said pivot means and a rear portion extending substantially horizontally and rearwardly, cranked axles extending rearwardly from alongside said rear portion of the housing member and having oppositely turned transversely extending trunnions at their forward ends, the opposite sides of the rear portion of the housing member having forwardly and rearwardly offset bearing openings and opposite thereto blind bearings of smaller diameter, said trunnion ends having bearing portions journaled in said bearing openings and smaller end portions journaled in said blind bearings, annular retainer rings releasably secured to the housing and holding the trunnion ends thereinto, seals in said retainer rings engaging the trunnion ends outwardly of the bearing openings, wheels supporting the rear ends of the axles, and the trunnion ends of the axles having meshing gear teeth to cause the axles to differentially move upwardly and downwardly, the rear ends of the axles being smaller in diameter than the said retainer rings whereby the same may be slipped over the axles and secured to the housing sides in assembling the axles and housing.

8. A vehicle wheel suspension of the character described for a vehicle frame, comprising in combination, a pair of forwardly and rearwardly extending housing members one at each side of the frame, means pivotally mounting the members to the frame at their forward ends for upward and downward swinging movements at their rear ends, means resisting upward movements of the said housing members, a pair of cranked axles arranged one along each side of the rear portion of each of said housing members and means journaling the forward ends of the axles in said members on transverse axes, means differentially connecting the axles for opposite upward and downward movements about their journaled forward ends, ground wheels supporting the rear ends of the axles, the said pivotal mounting means for the housing members having separate parts connected to said members and the frame and pivotally connected about upright axes, and the pivotal mounting means also including a generally transversely extending shaft of spring material connecting the members at opposite sides of the frame to yieldably resist movement of the housing members about said upright axes.

9. A vehicle wheel suspension of the character described for a vehicle frame, comprising in combination, front and rear tandem pairs of forwardly and rearwardly extending housing members arranged one at each side of the frame, means pivotally mounting the members to the frame at their forward ends for upward and downward swinging movements at their rear ends, means yieldably resisting upward movements of the said housing members, a pair of cranked axles arranged one along each opposite side of the rear portion of each of said housing members and means journaling the forward ends of the axles in said members on transverse axes, means differentially connecting the axles for opposite upward and downward movements at their rear ends, ground wheels supporting said rear ends of the axles, the said pivotal mounting means for each of the housing members having separate pivotally associated parts connected to said members and the frame and relatively movable about upright axes, and the pivotal mounting means also including a pair of generally transversely extending shafts of spring material connecting the tandem housing members at opposite sides of the frame to yieldably resist movement of the housing members about said upright axes.

10. A vehicle wheel suspension of the character described for a vehicle frame, comprising in combination, a pair of forwardly and rearwardly extending housing members located one at each side of the frame, means pivotally mounting the members to the frame at their forward ends for upward and downward swinging movements at their rear ends, means yieldably resisting upward movements of the said housing members, a pair of cranked axles arranged one along each side of the rear portion of each of said housing members and means journaling the forward ends of the axles in said members on transverse and forwardly and rearwardly offset axes, means differentially connecting the axles for differential upward and downward movements, ground wheels supporting the rear ends of the axles, the said pivotal mounting means for the housing members having separate pivotally associated parts connected to said members and the frame and relatively movable about upright axes, the crank axles being each of the same length and the wheels connected thereby being accordingly forwardly and rearwardly offset relative to each other, and the pivotal mounting means also including a generally transversely extending shaft of spring material connecting the housing members at opposite sides to yieldably resist movement of the housing members about said upright axes, the said shaft being bent to relatively forwardly and rearwardly offset its ends where they meet said mounting means to bring all of the wheels in a common diagonal line from one side to the other of the vehicle frame.

11. A vehicle wheel suspension of the character described for a vehicle frame, comprising in combination, a tandem pair of forwardly and rearwardly extending housing members at each side of the frame, means pivotally mounting the members to the frame at their forward ends for upward and downward swinging movements at their rear ends and said means including cross shafts of spring material, means yieldably resisting upward movements of the said housing members, a pair of cranked axles arranged one along each side of the rear portion of each of said housing members and means journaling the forward ends of the axles in said members on transverse and forwardly and rearwardly offset axes, means connecting the axles for differential upward and downward movements about their journaled forward ends, ground wheels supporting the rear ends of the axles, the said pivotal mounting means for the housing members having separate pivotally related parts connected to said members and the frame and relatively movable about upright axes with said movement restricted by the said spring shafts, one wheel of each pair being forwardly offset relative to the other wheel of the pair, and the said cross shafts being so bent as to bring their ends into forwardly and rearwardly offset relation in such manner as to bring both the front and rear wheels into a common diagonal line from one side of the vehicle frame to the other.

12. A vehicle wheel compensating suspension for a vehicle frame, comprising for each side of the frame a pair of tandem housing members extending generally forwardly and rearwardly, a two part bracket assembly for mounting the front end of each housing member and means pivoting said parts for relative and limited movements about an upright axis, one of said parts of each assembly being secured to the frame and the other having a transverse pivot member upon which the forward end of the associated housing member is pivoted for upward and downward movements at its rear end, the said housing members having substantially horizontal rear portions and upwardly angled forward portions, cranked axles arranged along opposite sides of each housing member and journaled on transverse axes and in substantially common horizontal planes at their forward ends in the said rear portions of the housing members, ground wheels supporting the rear ends of the axles, means connecting the respective axles at each housing member for differential upward and downward movements at their rear ends relative to the frame, a depending pivot swingably suspended from the rearmost pivot member, a beam pivotally mounted upon said depending pivot and extending forwardly therefrom, a swivel shackle pivotally connected between the forward end of the said beam and rear end portion of the forwardmost housing member, and a spring connected between said depending pivot and the rearmost housing member to yieldably resist upward movements of the wheels relative to the frame.

13. A vehicle wheel compensating suspension for a vehicle frame, comprising for each side of the frame a pair of tandem housing members extending forwardly and rearwardly, a two part bracket assembly for mounting the front end of each housing member and means pivoting said parts for relative and limited movements about an upright axis, one of said parts of each assembly being secured to the frame and the other having a transverse pivot member upon which the forward end of the associated housing member is pivoted for upward and downward movements at its rear end, cranked axles arranged along opposite sides of each housing member and journaled on transverse axes and at their forward ends in the said rear portions of the housing members, ground wheels supporting the rear ends of the axles, means connecting the axles at each housing member for differential upward and downward movements at their rear ends relative to the frame, a depending pivot swingably suspended from the rearmost pivot member, a beam pivotally mounted upon said depending pivot and extending forwardly therefrom, a swivel shackle pivotally connected between the forward end of the said beam and rear end of the forwardmost housing member, a pair of members connected between the depending pivot and the rearmost housing member and having loosely telescoping cylindrical elements, and rubber bonded between said telescoping elements to yieldably resist upward movements of the wheels.

14. A vehicle wheel compensating suspension for a vehicle frame, comprising for each side of the frame a pair of tandem housing members extending forwardly and rearwardly, a two part bracket assembly for mounting the front end of each housing member and means pivoting said parts for relative and limited movements about an upright axis, one of said parts of each assembly being secured to the frame and the other having a transverse pivot member upon which the forward end of the associated housing member is pivoted for upward and downward movements at its rear end, cranked axles arranged along opposite sides of each housing member and journaled on transverse axes at their forward ends in the said rear portions of the housing members, ground wheels supporting the rear ends of the axles, means connecting the axles at each housing member for differential upward and downward movements at their rear ends relative to the frame, a depending pivot pivotally suspended from the rearmost pivot member, a beam pivotally mounted upon said depending pivot and extending forwardly therefrom, a swivel shackle pivotally connected between the forward end of the said beam and rear end of the forwardmost housing member, spring mechanism comprising separate elements connected between the depending pivot and the rearmost housing member and a volute spring operatively arranged between said elements to yieldably resist upward movements of the wheels.

15. A vehicle wheel compensating suspension for a vehicle frame, comprising for each side of the frame a pair of tandem housing members extending forwardly and rearwardly, a two part bracket assembly for mounting the front end of each housing member and means pivoting said parts for relative and limited movements about an upright axis, one of said parts of each assembly being secured to the frame and the other having a transverse pivot member upon which the forward end of the associated housing member is pivoted for upward and downward movements at its rear end, cranked axles arranged along opposite sides of each housing member and journaled on transverse axes at their forward ends in the said rear portions of the housing members, ground wheels supporting the rear ends of the axles, means connecting the axles at each housing member for differential upward and downward movements at their rear ends relative to the frame, a depending pivot swingably suspended from the rear most pivot member, a beam pivotally mounted upon said depending pivot and extending forwardly therefrom, a swivel shackle pivotally connected between the forward end of the said beam and rear end of the forwardmost housing member, a lever fulcrumed on the rearmost housing member and a link connecting one end of the lever to the depending pivot, and a retractile coil spring connecting the other end of the lever to the housing and resisting upward movement of the wheels.

16. A vehicle wheel compensating suspension for a vehicle frame, comprising for each side of the frame a pair of tandem housing members extending forwardly and rearwardly, a two part bracket assembly for mounting the front end of each housing member and means pivoting said parts for relative and limited movements about an upright axis, one of said parts of each assembly being secured to the frame and the other having a transverse pivot member upon which the forward end of the associated housing member is pivoted for upward and downward movements at its rear end, cranked axles arranged along opposite sides of each housing member and journaled on transverse axes at their forward ends in the said rear portions of the housing members, ground wheels supporting the rear ends of the axles, means connecting the axles at each housing member for differential upward and downward movements at their rear ends relative to the frame, a depending pivot swingably suspended from the rearmost pivot member, a beam pivotally mounted upon said depending pivot and extending forwardly therefrom, a swivel shackle pivotally connected between the forward end of the said beam and rear end of the forwardmost housing member, a lever fulcrumed on the rearmost housing member, a link connecting the lever to the said depending pivot, and a compression coil spring engaging the lever to yieldably resist upward movements of the wheels.

17. A vehicle wheel compensating suspension for a vehicle frame, comprising for each side of the frame a pair of tandem housing members extending forwardly and rearwardly, a two part bracket assembly for mounting the front end of each housing member and means pivoting said parts for relative and limited movements about an upright axis, one of said parts of each assembly being secured to the frame and the other having a transverse pivot member upon which the forward end of the associated housing member is pivoted for upward and downward movements at its rear end, cranked axles arranged along opposite sides of each housing member and journaled on transverse axes at their forward ends in the said rear portions of the housing members, ground wheels supporting the rear ends of the axles, means connecting the axles at each housing member for differential upward and downward movements at their rear ends relative to the frame, a depending pivot swingably suspended from the rearmost pivot member, a beam pivotally mounted upon said depending pivot and extending forwardly therefrom, a swivel shackle pivotally connected between the forward end of the said beam and rear end of the forwardmost housing member, spring means connected between the depending pivot and the rearmost housing member to yieldably resist upward movements of the wheels relative to the frame, the said wheels all having brake assemblies and each such assembly having a part rotating with the wheel and a part operatively arranged for limited rotation on the associated axle under the influence of brake torque as the brakes are applied, each part rotatable on the axle having a lever arm, and brake torque reactor links connecting said lever arms to the said pivot members to transfer brake torque reaction from the brake assemblies to the frame at the pivot axes of said housing members.

18. A vehicle wheel suspension for a vehicle frame, comprising for each side of the frame a housing member extending forwardly and rearwardly, a bracket assembly for mounting the front end of each housing member to the frame and including a transverse pivot member upon which the forward end of the associated housing member is pivoted for upward and downward movements at its rear end, cranked axles arranged along opposite sides of each housing member and journaled on transverse axes and at their forward ends in the rear portions of the housing members, ground wheels supporting the rear ends of the axles, means connecting the axles for differential upward and downward movements at their rear ends relative to the frame, a member depending from the frame below said transverse pivot member, a pair of spring members connected between the said depending members and the housing members and having telescoping cylindrical elements, and rubber bonded between said telescoping elements to yieldably resist said upward movements of the housing members relative to the frame.

19. A vehicle wheel suspension for a vehicle frame, comprising for each side of the frame a housing member extending forwardly and rearwardly, a bracket assembly for mounting the front end of each housing member to the frame and including a transverse pivot member upon which the forward end of the associated housing member is pivoted for upward and downward movements at its rear end, cranked axles arranged along opposite sides of each housing member and journaled on transverse axes and at their forward ends in the rear portions of the housing members, ground wheels supporting the rear ends of the axles, means connecting the axles for differential upward and downward movements at their rear ends relative to the frame, a member depending from the frame below said transverse pivot member, and a tension spring connected between each said depending member and the associated housing to yieldably resist upward movements of the wheels and housing members.

20. A vehicle wheel suspension for a vehicle frame, comprising for each side of the frame a housing member extending forwardly and rearwardly, a bracket assembly for mounting the front end of each housing member to the frame and including a transverse pivot member upon which the forward end of the associated housing member is pivoted for upward and downward movements at its rear end, cranked axles arranged along opposite sides of each housing member and journaled on transverse axes and at their forward ends upon the rear portions of the housing members, ground wheels supporting the rear ends of the axles, means connecting the axles at each housing member for differential upward and downward movements at their rear ends relative to the frame, and means including a spring in tension operatively connected between each housing member and the frame for yieldably resisting said upward movements of said housing members.

References Cited in the file of this patent
UNITED STATES PATENTS

| | | |
|---|---|---|
| 2,217,817 | Ronning | Oct. 15, 1940 |
| 2,244,853 | Ronning | June 10, 1941 |
| 2,299,796 | Chase | Oct. 27, 1942 |
| 2,520,777 | Page | Aug. 29, 1950 |
| 2,599,707 | Gandelot | June 10, 1952 |
| 2,635,896 | Tantlinger | Apr. 21, 1953 |
| 2,698,758 | Ronning | Jan. 4, 1955 |